(12) United States Patent
Clark et al.

(10) Patent No.: US 7,853,758 B2
(45) Date of Patent: *Dec. 14, 2010

(54) AVOIDING FAILURE OF AN INITIAL PROGRAM LOAD IN A LOGICAL PARTITION OF A DATA STORAGE SYSTEM

(75) Inventors: Brian D. Clark, Tucson, AZ (US); Juan A. Coronado, Tucson, AZ (US); Beth A. Peterson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 662 days.

This patent is subject to a terminal disclaimer.

(21) Appl. No.: 11/837,880

(22) Filed: Aug. 13, 2007

(65) Prior Publication Data

US 2009/0049228 A1  Feb. 19, 2009

(51) Int. Cl.
*G06F 12/00* (2006.01)
*G06F 13/00* (2006.01)
*G06F 13/28* (2006.01)

(52) U.S. Cl. .................. 711/154; 711/153; 711/173; 713/1; 713/2; 718/1; 718/104

(58) Field of Classification Search .............. 711/154
See application file for complete search history.

(56) References Cited

U.S. PATENT DOCUMENTS 5,257,379 A  10/1993  Cwiakala et al.
2004/0215905 A1*  10/2004  Armstrong et al. .......... 711/156
2004/0230757 A1  11/2004  Brice, Jr. et al.
2005/0080982 A1*  4/2005  Vasilevsky et al. .......... 711/1
2005/0114623 A1  5/2005  Craddock et al.
2005/0144434 A1  6/2005  Taylor
2005/0177648 A1  8/2005  Tpyohara et al.

FOREIGN PATENT DOCUMENTS

EP  1693754  8/2006
WO  2005036405  4/2005

OTHER PUBLICATIONS

Banzhaf et al.; "SCSI initial program loading for zSeries"; Jul. 2004.*

(Continued)

*Primary Examiner*—Brian R Peugh
*Assistant Examiner*—Prasith Thammavong
(74) *Attorney, Agent, or Firm*—Dan Shifrin

(57) ABSTRACT

An initial program load (IPL) of a logical partition (LPAR) is managed by establishing a logical path to the LPAR from a storage controller. When a notice is received by the storage controller from the LPAR that the IPL has commenced, the LPAR address is stored in a data structure. After the storage controller initiates a pack change state interrupt, the stored address is compared with the addresses in a list of all LPARS to which the interrupt is directed. If the list of addresses includes the stored address, the stored address is removed from the list. Thus, the pack change state interrupt is transmitted only to the addresses in the list, leaving the LPAR to complete the IPL without interruption. After the storage controller receives a notice from the LPAR that the IPL has completed, the address of the LPAR is removed from the data structure.

15 Claims, 4 Drawing Sheets

OTHER PUBLICATIONS

Guenther, Robert L; "VM/ESA Performance Management in a PR/SMTM Environment"; Proceedings of the 19th International Conference for the Management and Performance Evaluation of Enterprise Computing Systems, 1994, vol. 2, pp. 847-858.

G. Banzhaf, F. W. Brice, G. R. Frazier, J. P. Kubala, T. B. Mathias, and V. Sameske; "SCSI Initial Program Loading for zSeries"; IBM Journal of Research and Development, 2004, vol. 48, No. 3/4.

I. G. Siegel, B. A. Glendening, and J. P. Kubala; "Logical Partition Mode Physical Resource Management on the IBM eServer z990"; IBM Journal of Research and Development, 2004, vol. 48, No. 3/4.

"Event Notification/Registry Between pSeries eServers and Platform Management Consoles;" Research Disclosure, Mason Publications, Hampshire, GB, vol. 447, No. 151, Jul. 1, 2001.

Schnee and Lenz, "Keeping Up With LPAR: Dynamic Changes;" IBM Systems Magazine, Sep. 2004; URL: http://www.ibmsystemsmag.com/ibmi/september04/administrator/8577p1.aspx>.

Ahmed, et al., "Resource ande Service Discovery in Large-Scale Multi-Domain Networks;" IEEE Communications Surveys, IEEE, New York, NY, vol. 9, No. 4, Oct. 1, 2007.

* cited by examiner

AVOIDING FAILURE OF AN INITIAL PROGRAM LOAD IN A LOGICAL PARTITION OF A DATA STORAGE SYSTEM

TECHNICAL FIELD

The present invention relates generally to data storage systems and, in particular, to initial program load operations in a logical partition of a data storage system.

BACKGROUND ART

A data storage system typically includes one or more storage controllers coupled one or more data storage devices, such as hard disk drives (HDDs). The controller receives read and write requests from one or more hosts, processes the requests and, in response reads the requested data from or writes (records) data to the storage device. Larger storage systems enable one physical host to be divided into one or more logical partitions (LPARs) which operate as separate, virtual computers. The LPARs may also run under different operating systems and may execute different application programs. During the initial program load (IPL) of the LPAR, logical paths are established between the host and the storage controller, enabling the two to communicate with each other. Worldwide network node numbers (WWNN) are used to enable links between the communicating devices.

During the IPL of one LPAR, another LPAR may decide to change the state of peer-to-peer remote copy (PPRC) devices, such as from 'PPRC Full Duplex' to 'PPRC Suspended,' using a 'Freeze' command from the host to the storage controller.

When the 'Freeze' command is executed, the storage controller sends a pack change or state change interrupt for all devices in a PPRC relationship and to all known paths and path groups. The interrupt may be received by an LPAR which is undergoing an IPL. Should this occur, the LPAR is forced to disrupt the IPL and contend with the pack change interrupt and the ensuing validation and query commands. Because the pack change interrupt is sent one per path for each device that changed state from 'PPRC Full Duplex' to 'PPRC Suspended,' the large number of pack changes and required command processing can cause the IPL of the LPAR to take a very long time to complete. In some cases, the IPL may fail.

SUMMARY OF THE INVENTION

The present invention reduces the performance impact on an LPAR IPL and reduces the risk of IPL failure due to contending with pack change or state change interrupts received during an IPL. An initial program load (IPL) of a logical partition (LPAR) is managed by establishing a logical path to the LPAR from a storage controller. When a notice is received by the storage controller from the LPAR that the IPL has commenced, the address of the LPAR is stored in a data structure. Subsequently, after the storage controller initiates a pack change state interrupt, the stored address is compared with the addresses in a list of all LPARs to which the pack change state interrupt is directed. If the list of addresses includes the stored address, the stored address is removed from the list. Thus, the pack change state interrupt is transmitted only to the addresses in the list, leaving the LPAR to complete the IPL without interruption. After the storage controller receives a notice from the LPAR that the IPL has completed, the address of the LPAR is removed from the data structure.

The present invention provides a storage controller comprising a first data structure for storing an address of a first of a plurality of LPARs upon receipt of a first notice from the first LPAR that an IPL of the first LPAR has commenced and a second data structure for storing addresses of all LPARS to which a newly initiated pack change state interrupt is directed. The storage controller further comprises a processor and a memory for storing computer-readable code executable by the processor. The code comprises instructions for comparing the address in the first data structure with the addresses in the second data structure, removing the address of the first LPAR from the second data structure if the second data structure includes the address of the first LPAR, transmitting the pack change state interrupt to only the addresses remaining in the second data structure, and removing the address of the first LPAR from the first data structure upon receipt of receiving a second notice from the first LPAR that the IPL of the first LPAR has completed.

DETAILED DESCRIPTION OF THE PREFERRED EMBODIMENT

Figure 1:
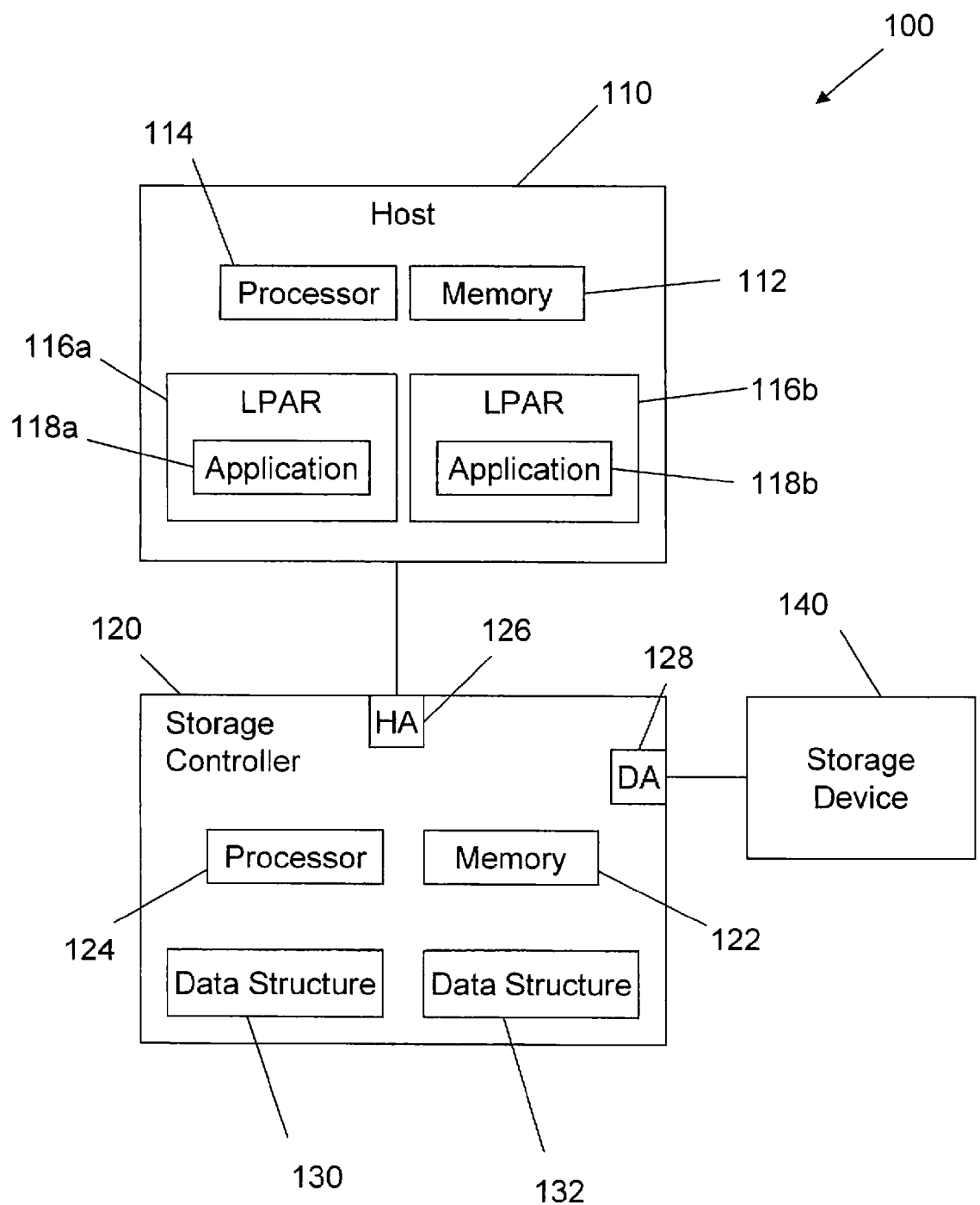
FIG. 1 is a block diagram of a data processing system in which the present invention may be implemented.
Figure 2:
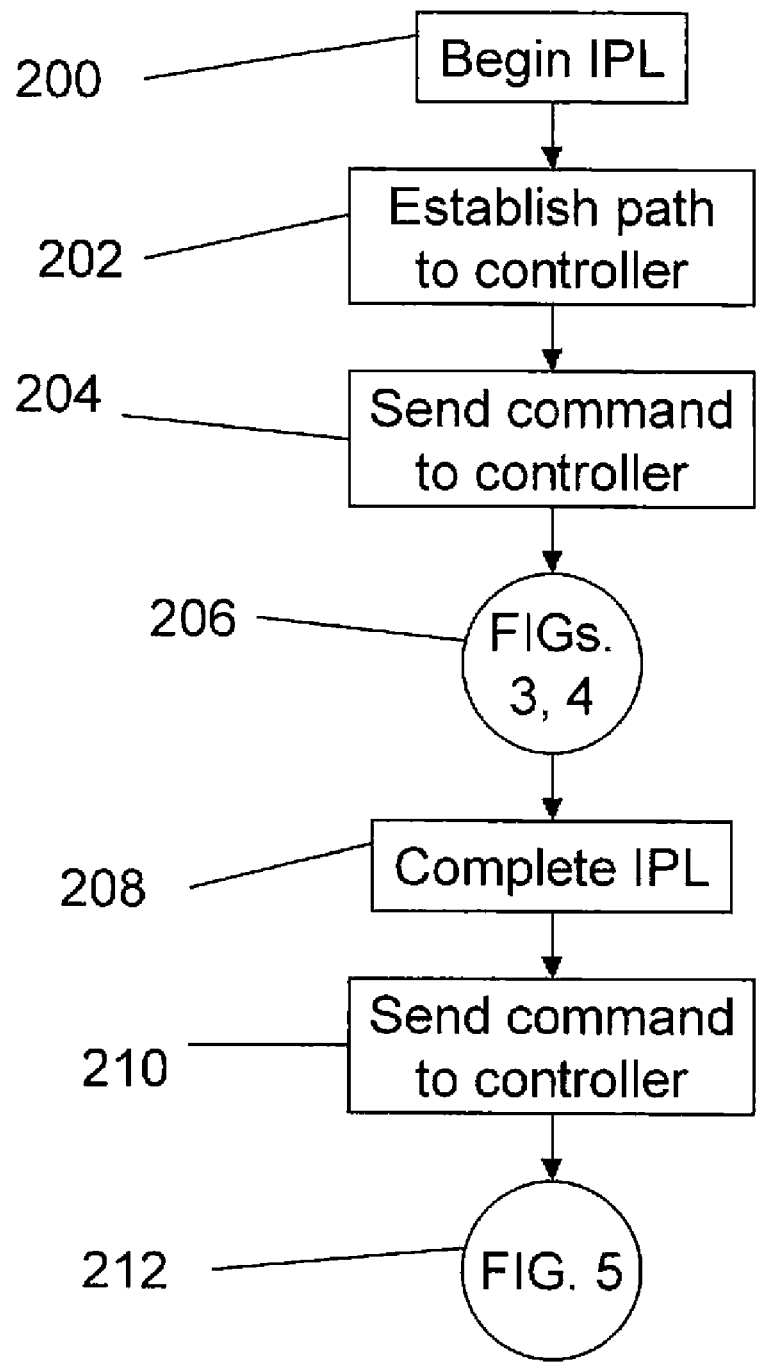
FIG. 2 is a flowchart of one aspect of a method of the present invention.

FIG. 1 is a block diagram of a data processing system 100 in which the present invention may be implemented. The system 100 includes one or more hosts, collectively represented by a host 110, one or more storage controllers, collectively represented by a storage controller 120, and one or more storage devices, collectively represented by the storage device 140. The storage device 140 may be any type of storage device, such as hard disk drives, or a combination of devices. The host 110 includes a memory 112 for storing computer-readable code containing program instructions and a processor 114 which executes the instructions stored in the memory 112. The host 110 can create multiple logical partitions (LPARs), two of which are illustrated in FIG. 1 as 116a and 116b. Each LPAR 116a, 116b is capable of running one or more applications 118a, 118b, respectively.

The storage controller 120 includes a memory 122 for storing computer-readable code containing program instructions and a processor 124 which executes the instructions stored in the memory 122. The storage controller also includes host adapters or interfaces, represented by a host adapter 126, through which communications with the host 110 pass, and device adapters or interfaces, represented by a device adapter 128, through which communications with the storage device 140 pass. The storage controller 120 further includes two data structures 130, 132. Either or both of the data structures 130, 132 may be stored in the memory 122 or may be stored in other memory.

A method of the present invention will now be described with reference to the flowcharts of FIGS. 2-5. The method may be executed by the processors 114, 124 from program instructions stored in the memory devices 112, 122, may performed by hardware, such as ASICs in the host 110 and storage controller 120, or by any combination. An LPAR 116a begins an initial program load (step 200) and establishes a communications path with the storage controller 120 (step 202). The LPAR 116a then transmits a command to the storage controller 120 (step 204) notifying the storage controller 120 that an IPL is underway. The command may be a single command having two states, such as an IPL indicator with "set" and "reset" states. Alternatively, the command may be one of two separate commands, the second having an "IPL Complete" indicator as described below. The command, whether a single command or one of two commands, can be part of new orders of the existing defined system operation (DSO) command or new z/Os command(s) that are allowed through most exception conditions, such as "Reserve", "Long Busy," etc.

Figure 3:
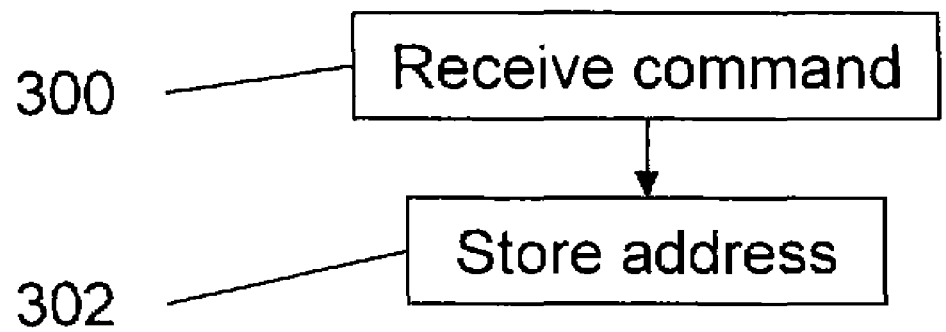
FIGS. 3, 4, 5 are a flowcharts of further aspects of a method of the present invention.
Figure 5:
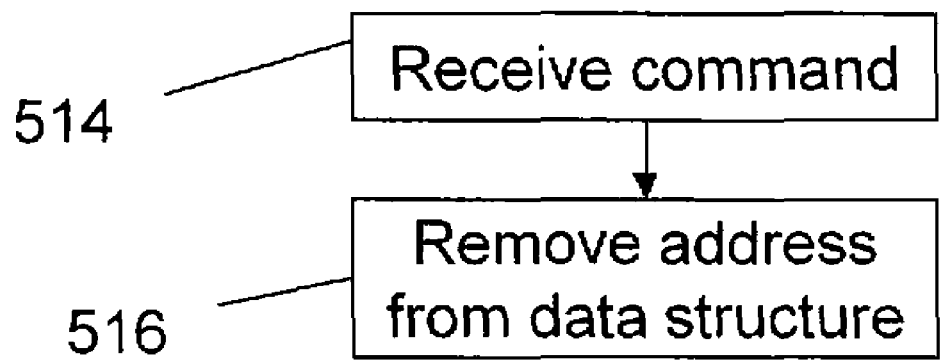
Figure 4:
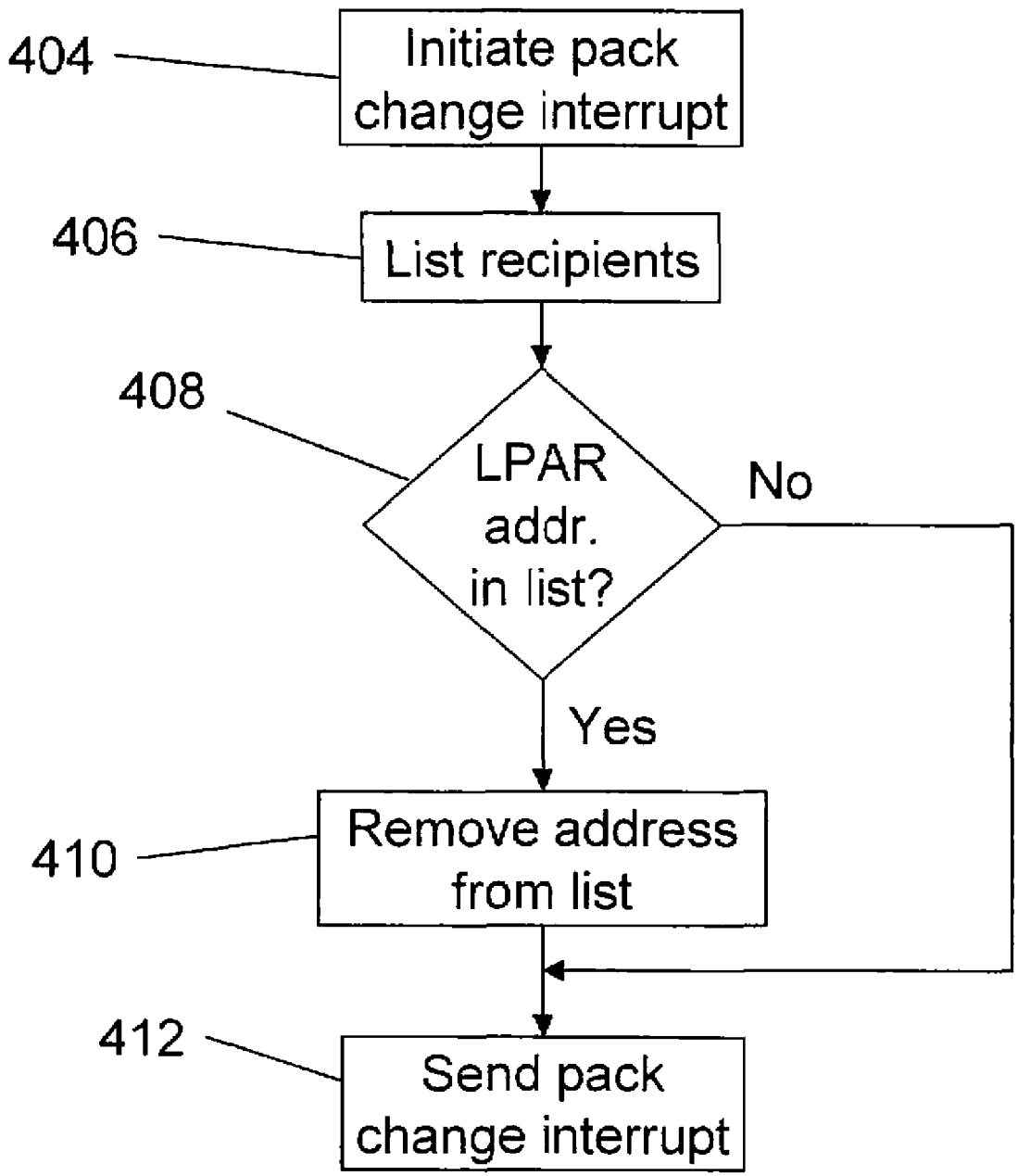

Turning now to FIG. 3 (step 206), the storage controller 120 receives the command from the LPAR 116a (step 300) and stores the address or other identity of the LPAR 116a in a data structure 130 (step 302). Preferably, the data structure 130 is sufficiently large to store the addresses of more than one LPAR which are undergoing an IPL. Also preferably, the address of the LPAR comprises the worldwide network node number (WWNN) of the LPAR 116a. By contrast, a worldwide port number (WWPN) only identifies a host adapter port which is not sufficiently specific of the present invention. The data structure 130 may be a register, a location in the memory 122, a lookup table or any other structure associated with the storage controller 120 capable of storing the identity of the LPAR 116a.

When the storage controller 120 initiates a pack change state interrupt (FIG. 4, step 404), it generates a list of the addresses, such as the WWNNs, of all devices in a PPRC relationship and to all known paths and path groups (step 406). The list may be stored in a second data structure 132. As with the first data structure 130, the second data structure 132 may be a register, a location in the memory 122, a lookup table or any other structure associated with the storage controller 120 capable of storing the addresses of recipients of the pack change state interrupt. Instead of then queuing the addresses, the storage controller 120 first compares any address(es) in the first data structure identifying LPARs which are undergoing an IPL (step 408). If the address of the LPAR 116a is found in the data structure list 132, the address is removed from the list (step 410). Next, or if the address of the LPAR 116a is not found in the list 132, the storage controller 120 queues the addresses remaining in the 132 list and sends the pack change state interrupt to only those addresses (step 412). Thus, the LPAR 116a and any other LPAR undergoing an IPL will not have to contend with such an interrupt.

When the IPL of the LPAR 116a is completed (step 208, FIG. 2), the LPAR 116a sends a command to the storage controller (step 210) indicating that the IPL is complete. Moving to FIG. 5 (step 212), the storage controller 120 receives the command (step 514). As described above, the command be the second state of the original command or may be a separate command. When the storage controller 120 has received the second command from the LPAR 116a, it removes the address of the LPAR 116a from the first data structure 130 (step 516), allowing the LPAR 116a to receive subsequent pack change state interrupts.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies regardless of the particular type of signal bearing media actually used to carry out the distribution. Examples of computer readable media include recordable-type media such as a floppy disk, a hard disk drive, a RAM, and CD-ROMs and transmission-type media such as digital and analog communication links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for managing an initial program load (IPL) of a logical partition (LPAR) established in a host or a method for deploying computing infrastructure comprising integrating computer readable code into a computing system for managing an initial program load (IPL) of a logical partition (LPAR) established in a host.

What is claimed is:

1. A storage controller, comprising:
    a first data structure for storing an address of a first of a plurality of logical partitions (LPARs) upon receipt of a first notice from the first LPAR that an initial program load (IPL) of the first LPAR has commenced;
    a second data structure for storing addresses of all LPARS to which a newly initiated pack change state interrupt is directed;
    a processor; and
    a memory for storing computer-readable code executable by the processor, the code comprising instructions for:
        comparing the address in the first data structure with the addresses in the second data structure;
        removing the address of the first LPAR from the second data structure if the second data structure includes the address of the first LPAR;
        transmitting the pack change state interrupt to only the addresses remaining in the second data structure; and
        removing the address of the first LPAR from the first data structure upon receipt of receiving a second notice from the first LPAR that the IPL of the first LPAR has completed.

2. The storage controller of claim 1, wherein the first data structure comprises memory for storing a worldwide network node number of the LPAR.

3. The storage controller of claim 1, wherein the first and second notices from the first LPAR comprise a single command with an IPL indicator, the IPL indicator having first and second states.

4. The storage controller of claim 3, wherein the single command comprises a defined subsystem operation command.

5. The storage controller of claim 1, wherein the first notice from the first LPAR comprises a first command and the second notice from the first LPAR comprises a second command.

6. The storage controller of claim 5, wherein the first and second commands each comprise a defined subsystem operation command.

7. A computer program product of a computer readable storage medium usable with a programmable computer, the computer program product having computer-readable code embodied therein for managing an initial program load (IPL) of a logical partition (LPAR) established in a host, the computer-readable code comprising instructions for:
    establishing a logical path to an LPAR;
    receiving a first notice from the LPAR that an IPL of the LPAR has commenced;

storing the address of the LPAR in a data structure indicating active IPL processing;
initiating a pack change state interrupt;
comparing the stored address with the addresses in a list of all LPARS to which the pack change state interrupt is directed;
if the list of addresses includes the stored address, removing the stored address from the list;
transmitting the pack change state interrupt to only the addresses in the list;
receiving a second notice from the LPAR that the IPL of the LPAR has completed; and
removing the address of the LPAR from the data structure.

8. The computer program product of claim 7, wherein the instructions for storing the address in the data structure comprise instructions for storing a worldwide network node number of the LPAR in the data structure.

9. The computer program product of claim 7, wherein the first and second notices from the LPAR comprise a single command with an IPL indicator, the IPL indicator having first and second states.

10. The computer program product of claim 9, wherein the single command comprises a defined subsystem operation command.

11. The computer program product of claim 7, wherein the first notice from the LPAR comprises a first command and the second notice from the LPAR comprises a second command.

12. The computer program product of claim 11, wherein the first and second commands each comprise a defined subsystem operation command.

13. A storage controller, comprising:
an interface through which a path is established with a logical partition (LPAR) in a host;
a data structure;
a processor; and
a memory for storing computer-readable code executable by the processor, the code comprising instructions for:
receiving a first defined subsystem operation command through the interface from the LPAR that an initial program load (IPL) of the LPAR has commenced;
storing a worldwide network node number (WWNN) of the LPAR in the data structure indicating active IPL processing;
initiating a pack change state interrupt;
comparing the stored WWNN with WWNNs in a list of all LPARS to which the pack change state interrupt is directed;
removing the stored WWNN from the list if the list of WWNNs includes the stored WWNN;
transmitting the pack change state interrupt to only the WWNN s in the list;
receiving a second defined subsystem operation command from the LPAR that the IPL of the LPAR has completed; and
removing the WWNN of the LPAR from the data structure.

14. The storage controller of claim 13, wherein the first and second notices from the LPAR comprise a single command with an IPL indicator, the IPL indicator having first and second states.

15. The storage controller of claim 13, wherein the first notice from the LPAR comprises a first command and the second notice from the LPAR comprises a second command.

* * * * *